(12) United States Patent
HedegÅrd

(10) Patent No.: US 7,347,387 B2
(45) Date of Patent: Mar. 25, 2008

(54) DISTRIBUTOR FOR DISTRIBUTING A FLUID TO A NUMBER OF FLUID APPLICATION NOZZLES

(76) Inventor: Albert HedegÅrd, Lille Hedegårdsvej 2, Borbjerg, Holstebro (DK) 7500

( * ) Notice: Subject to any disclaimer, the term of this patent is extended or adjusted under 35 U.S.C. 154(b) by 0 days.

(21) Appl. No.: 11/454,637

(22) Filed: Jun. 16, 2006

(65) Prior Publication Data

US 2006/0237562 A1   Oct. 26, 2006

Related U.S. Application Data

(63) Continuation of application No. PCT/DK2004/000871, filed on Dec. 16, 2004.

(30) Foreign Application Priority Data

Dec. 19, 2003   (DK)   ................. 2003 01898

(51) Int. Cl.
- B05B 1/14 (2006.01)
- B05B 1/16 (2006.01)
- B05B 15/02 (2006.01)
- E01C 19/16 (2006.01)
- E01C 19/17 (2006.01)

(52) U.S. Cl. ............... 239/555; 239/553.3; 239/172; 239/110

(58) Field of Classification Search ............... 239/555, 239/553.3, 172, 110, 106, 146, 159, 170, 239/396, 442, 548, 552, 553, 554, 562, 589, 239/590, 590.3, 600; 137/561 A, 561 R, 137/594; 111/118, 119, 127

See application file for complete search history.

(56) References Cited

U.S. PATENT DOCUMENTS

| | | | |
|---|---|---|---|
| 2,889,852 A | 6/1959 | Dunlap | 137/625.19 |
| 2,950,737 A | 8/1960 | Hendrix | 137/625.48 |
| 3,139,848 A | 7/1964 | Welty | 111/7 |
| 3,799,080 A | 3/1974 | Horn | 117/7 |
| 4,023,020 A | 5/1977 | Lestradet | 701/50 |
| 4,144,904 A | 3/1979 | Dits | 137/625.3 |
| 4,284,243 A | 8/1981 | Shaner | 239/469 |
| 4,760,963 A * | 8/1988 | Waldrum | 239/245 |
| 4,803,626 A * | 2/1989 | Bachman et al. | 701/50 |
| 6,283,049 B1 | 9/2001 | Swanson | 111/119 |
| 7,063,276 B2 * | 6/2006 | Newton | 239/302 |
| 7,162,961 B2 * | 1/2007 | Grimm et al. | 111/119 |

FOREIGN PATENT DOCUMENTS

DK   2003 00151 U4   7/2003

* cited by examiner

*Primary Examiner*—Darren Gorman
(74) *Attorney, Agent, or Firm*—Winston & Strawn LLP

(57) ABSTRACT

A distributor which is mountable on a vehicle and is arranged for distributing a fluid from a reservoir to a number of nozzles through which the fluid is dispensed. The distributor includes housing, a first number of connections extending from the reservoir to the housing, a second number of connections extending from the housing to a nozzle, and a number of multi-orifice plates. The orifices in at least some of the multi-orifice plates have different sizes than the orifices in at least some other plates. The distributor also includes mountings in the housing for detachably fixing one or more multi-orifice plates at a time in the housing, and a distribution chamber inside the housing. The chamber is in communication with both the first number of fluid connections and the orifices of the multi-orifice plate(s) fixed in the housing. Also provided are a third number of fluid connections extending from each orifice in the multi-orifice plate(s) to each second fluid connection. In this way a distributor is provided which makes it possible to change the size a number of orifices simultaneously.

11 Claims, 7 Drawing Sheets

DISTRIBUTOR FOR DISTRIBUTING A FLUID TO A NUMBER OF FLUID APPLICATION NOZZLES

CROSS-REFERENCE TO RELATED APPLICATIONS

This application is a continuation of International application PCT//DK2004/000871 filed Dec. 16, 2004, the entire content of which is expressly incorporated herein by reference thereto.

FIELD OF THE INVENTION

The present invention relates to a distributor, mountable on a vehicle, arranged for distributing a fluid from a reservoir to a number of fluid application nozzles through which the fluid is dispensed to the ground.

BACKGROUND OF THE INVENTION

In this application, the distributor according to the invention will be described as a component of a system for spreading fertilizer. However, within the scope of the invention, the distributor can easily be adapted to many other applications. Two examples of such applications are salt spreaders and water spreaders.

A system for spreading fertilizer is usually mounted to a tractor and comprises a central tank containing the fertilizer, means to pump the fertilizer out of the tank, and a number of nozzles through which the fertilizer is output to the target environment.

It is typically desired to control how much fertilizer is output by each nozzle. However, the control of this quantity depends upon a large number of variables. For example the flow rate of the fertilizer out of each nozzle will be dependent on the type of fluid, the temperature of the fluid, the pressure in the system, the geometry of the nozzle, etc. In addition it is typically desired to control the amount of fertilizer output by the system as a function of the speed of the tractor. The faster the tractor drives, the higher the fluid flow should be in order to keep the amount of fertilizer being spread on the ground the same.

The amount of flow out of each nozzle is typically controlled by a combination of varying the pressure of the fluid and by changing the size of an orifice located in each nozzle.

In some of the prior art, such as U.S. Pat. No. 3,815,830 the entire nozzle is changed to change the flow rate. In other, more recent, prior art, nozzles have been designed with "orifice plates". An orifice plate is a plate with a fixed sized hole in it. Different orifice plates are available with different sized holes. By putting different orifice plates in a nozzle, the flow output for the nozzle can be changed.

Up to 100 orifice plates with orifices of differing sizes are available for a typical nozzle. Said orifices typically range in size from 0.1 to 3 mm in diameter. In addition, a large spraying machine can have up to 100 nozzles. This results in a large number orifice plates which need to be kept in stock.

The orifice plates are usually changed manually. The nozzle is opened up, the orifice plate taken out, a new orifice plate set in, and the nozzle closed up again. This is very time consuming, especially for the larger sprayers with a large number of nozzles. In addition there is a risk of getting contaminants inside the nozzle, which could block the nozzle and prevent it from functioning properly.

GB patent 1,068,895 presents a liquid fertilizer distributing apparatus designed to overcome the above-mentioned problems. The apparatus comprises a manifold, which distributes fertilizer to two independent nozzles. The manifold comprises a circular disc with two identical series of orifices of varying size placed around the circumference of the disc. The fluid from the tank is directed into two paths, each flowing through an orifice in the circular disc. After passing through the orifices, the two fluid paths are directed to nozzles. When the flow rate is to be changed, the circular disc is rotated thereby changing the orifice size. This invention therefore solves the problem of having to manually change all the orifice plates. However, the solution is limited to systems having a small number of nozzles. Additional nozzles require additional orifice series, spaced circumferentially. This requires quite a large amount of space. For example, consider the disc required for a system with 100 nozzles. This would require 100 circumferentially spaced series. Another issue with this solution is that there are a number of different sized orifices on the same plate which also makes the metering disc larger.

SUMMARY OF THE INVENTION

A first aspect of the present invention is to provide a distributor as mentioned in the opening paragraph where the orifice size for all the nozzles can be changed simultaneously.

A second aspect of the present invention is to provide a distributor as mentioned in the opening paragraph where the orifice size can be different for different nozzles.

A third aspect of the present invention is to provide a distributor as mentioned in the opening paragraph, which does not result in an overly large distributor.

A fourth aspect of the current invention is to provide a distributor as mentioned in the opening paragraph which provides an adjustable orifice opening.

A fifth aspect of the current invention is to provide a distributor as mentioned in the opening paragraph which provides a mechanism for self-cleaning of the orifices.

The new and unique way in which the current invention fulfills the above mentioned aspects is by presenting a distributor as mentioned in the opening paragraph which comprises a housing, a first number of fluid connections extending from the reservoir to the housing, a second number of fluid connections extending from the housing to each their fluid application nozzle, a number of multi-orifice plates, the orifices in at least some of the multi-orifice plates having different sizes than the orifices in at least some of the other multi-orifice plates, mountings in the housing for detachably fixing one or more multi-orifice plates at a time in the housing, a distribution chamber inside the housing, which is in communication with both the first number of fluid connections and the orifices of the multi-orifice plate(s) fixed in the housing, and a third number of fluid connections extending from each their orifice in said multi-orifice plate(s) to each their second fluid connection.

Since the distributor contains a multi-orifice plate which throttles the flow to the individual fluid application nozzles simultaneously through the orifices in the multi-orifice plate, the orifice size for all the nozzles can be simultaneously changed just by changing the multi-orifice plate. In addition, since each fluid application nozzle is associated with an orifice, different fluid application nozzles can have different sized orifices, just by manufacturing a multi-orifice plate where the orifices are made different sizes. Furthermore, since there is only one orifice for each fluid application nozzle, the size of the distributor is significantly reduced when compared to the prior art.

In a preferred embodiment, most of the orifices in at least one multi-orifice plate are of the same size. In this way, each fluid application nozzle in the system will have the same flow output.

A preferred embodiment of the housing comprises, an annular frame, a first wall which is mounted on one side of the frame and is provided with at least one inlet for the first number of fluid connections, and a second wall which is mounted on the other side of the frame and is provided with outlets for the second number of fluid connections. This provides a simple and compact housing. The multi-orifice plate can be arranged "sandwiched" between the two walls.

Mountings for fixing the multi-orifice plate(s) in the housing can, in one embodiment, comprise a grate, which is placed in the distribution chamber and which defines a number of through openings, at least some of which are in communication with each other. In this way, by applying pressure to the grate, the grate can apply a uniform pressure to the multi-orifice plate while retaining a common pressure throughout the distribution chamber.

In order to press the multi-orifice plate against the second wall of the housing, the distributor can further comprise pressure means for directly or indirectly applying pressure to press the multi-orifice plate(s) against the second wall of the housing. This ensures that a good seal is established between the multi-orifice plate(s) and the second wall of the housing.

In order to make it easier to exchange the multi-orifice plates, at least one of the walls of the housing can be movably mounted on the frame and the pressure means can be adapted to act upon said wall with a pressure directed against the opposite wall. In this way, the movably mounted wall can be used to open the housing. Once the housing is opened the multi-orifice plate can easily be exchanged with another multi-orifice plate.

In another embodiment at least one of the walls of the housing can be pivotably mounted on the frame and the pressure means can be adapted to act on said wall with a moment of rotation. By mounting at least one of the walls pivotably a simple construction is provided.

In another embodiment, at least two mutually slideable multi-orifice plates with overlapping orifices can be arranged inside the housing. By adjusting the amount of overlap between the orifices, the flow through the multi-orifice plates can be adjusted.

Preferably the orifices (29,28) in at least one of the slidable multi-orifice plates (24,25) fixed in the housing can be narrow slots. In this way, a large adjustment range can be provided while retaining a throttling effect.

In order to clean the inside of the distributor a cleaning outlet (21), with a shut-off valve (13), can be located in the housing (2,3) between the first wall of the housing and the multi-orifice plate(s) (15;24,25) mounted in the housing. With this cleaning outlet, the inside of the distributor can be rinsed by connecting a cleaning fluid to the inlet and opening the shut-off valve.

BRIEF DESCRIPTION OF THE FIGURES

The invention will be explained in greater detail below where further advantageous properties and example embodiments are described with reference to the drawings, in which.

DESCRIPTION OF PREFERRED
EMBODIMENTS OF THE INVENTION

Figure 1:
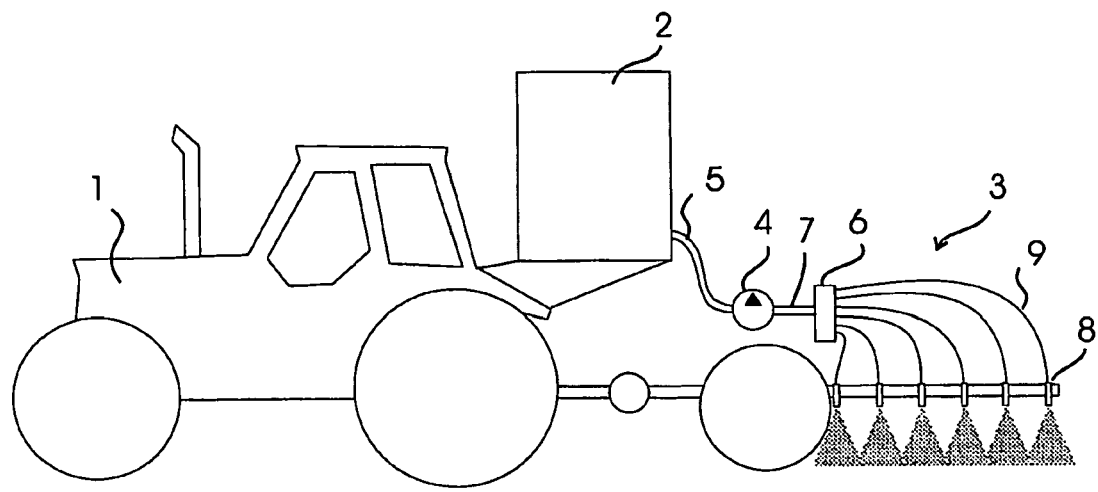
FIG. 1 shows a typical application of a distributor according to the invention.

FIG. 1 shows a typical application of a distributor according to the invention. The figure shows a tractor 1, a fluid reservoir 2 and a trailer sprayer 3. The sprayer 3 comprises a pump 4 connected to the fluid reservoir 2 via a first hose 5, a distributor 6 connected to the pump 4 via a second hose 7, and a number of nozzles 8 connected to the distributor 6 via a number of third hoses 9. The nozzles 8 can be called fluid application nozzles 8, since they apply fluid to the ground. It should be noted that the term ground should be interpreted rather broadly. Within the scope of the invention, the nozzles could also apply fluid to many other things besides the ground. Some examples being bushes, trees, or crops.

Figure 2:
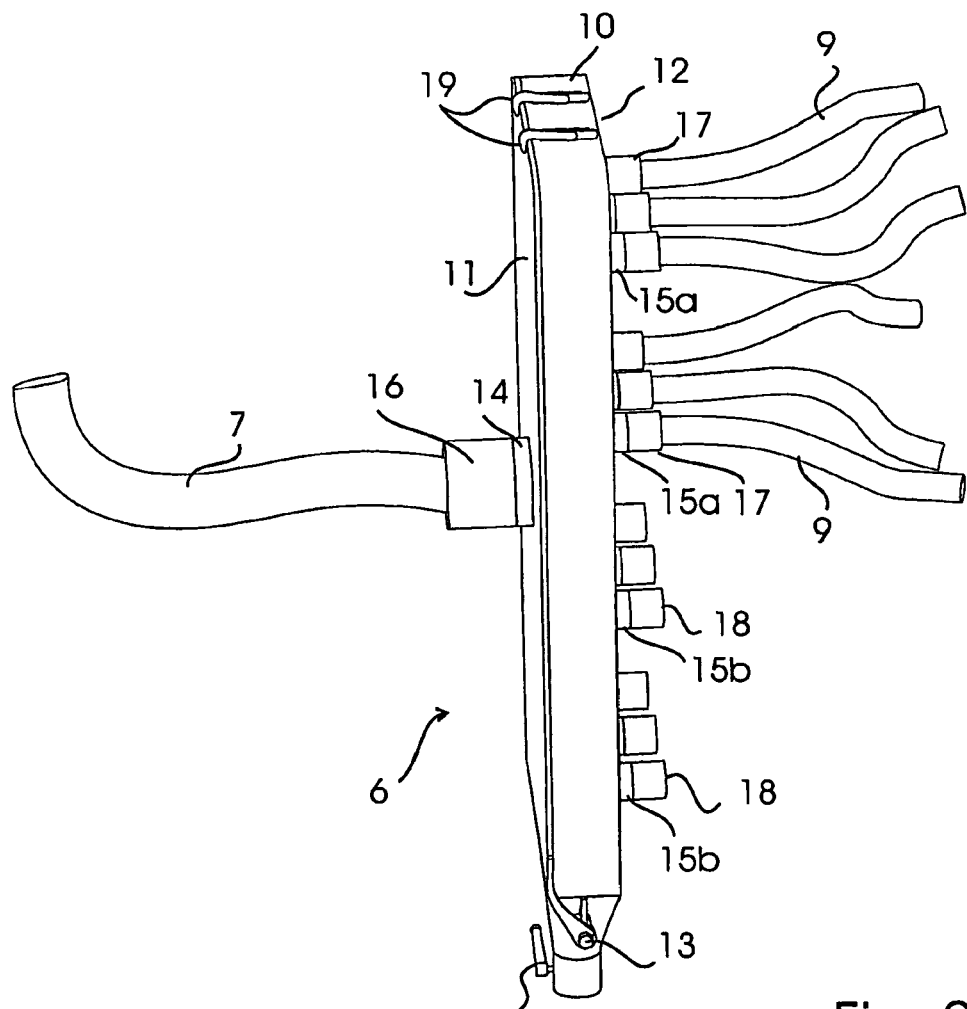
FIG. 2 shows a close-up view of the distributor shown in FIG. 1.

FIG. 2 shows a close-up view of one embodiment of a distributor 6 which could be used in the system shown in FIG. 1. The distributor 6 comprises a housing which is made up of an annular frame 10 and two walls 11,12. The first wall 11 is formed as a lid 11 and is pivotably attached to the frame 10 via a hinge 13. The second wall 12 is rigidly attached to the frame 10. An inlet 14 is placed in the lid 11 and a number of outlets 15 are placed in the second wall 12. In FIG. 1 the inlet 14 is connected to a hose 7 via a quick connect coupling 16. The outlets 15 are connectable to nozzles 8 via hoses 9. In machines where there are fewer nozzles 8 than outlets 15, the unused outlets 15b can be plugged. In FIG. 2 six of the outlets 15a are connected to nozzles 8 via hoses 9. The hoses 9 are connected to the outlets 15a via quick connect couplings 17. However, many other types of connectors could also be used, two examples being screw threads and hose clamps. In this embodiment, the remaining six outlets 15b are shown plugged by caps 18.

Latches 19 on the annular frame 10 hold the lid 11 clamped in place. The latches 19 work to press the lid 11 against the opposite wall 12. Other forms of pressure means can also be used, some examples being hydraulic cylinders, magnets, screws, etc. When the latches 19 are engaged, a watertight seal is formed between the lid 11 and the annular frame 10. A valve 20 on the bottom of the annular frame 10 can be opened to self-clean the inside of the distributor. The self-cleaning function will be described in more detail later on.

Figure 3:
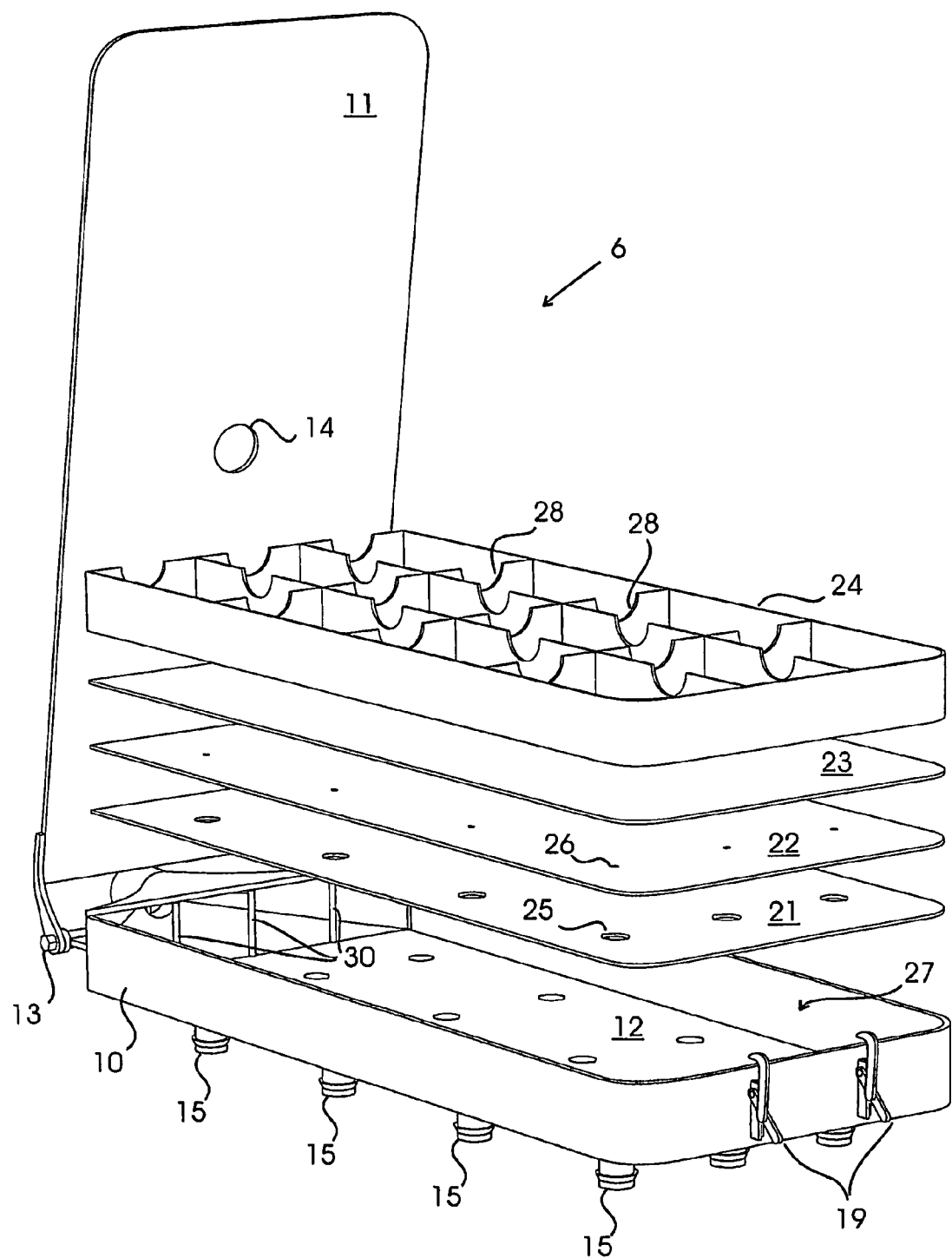
FIG. 3 is an exploded view seen in perspective of a first embodiment of a distributor according to the invention.
Figure 4:
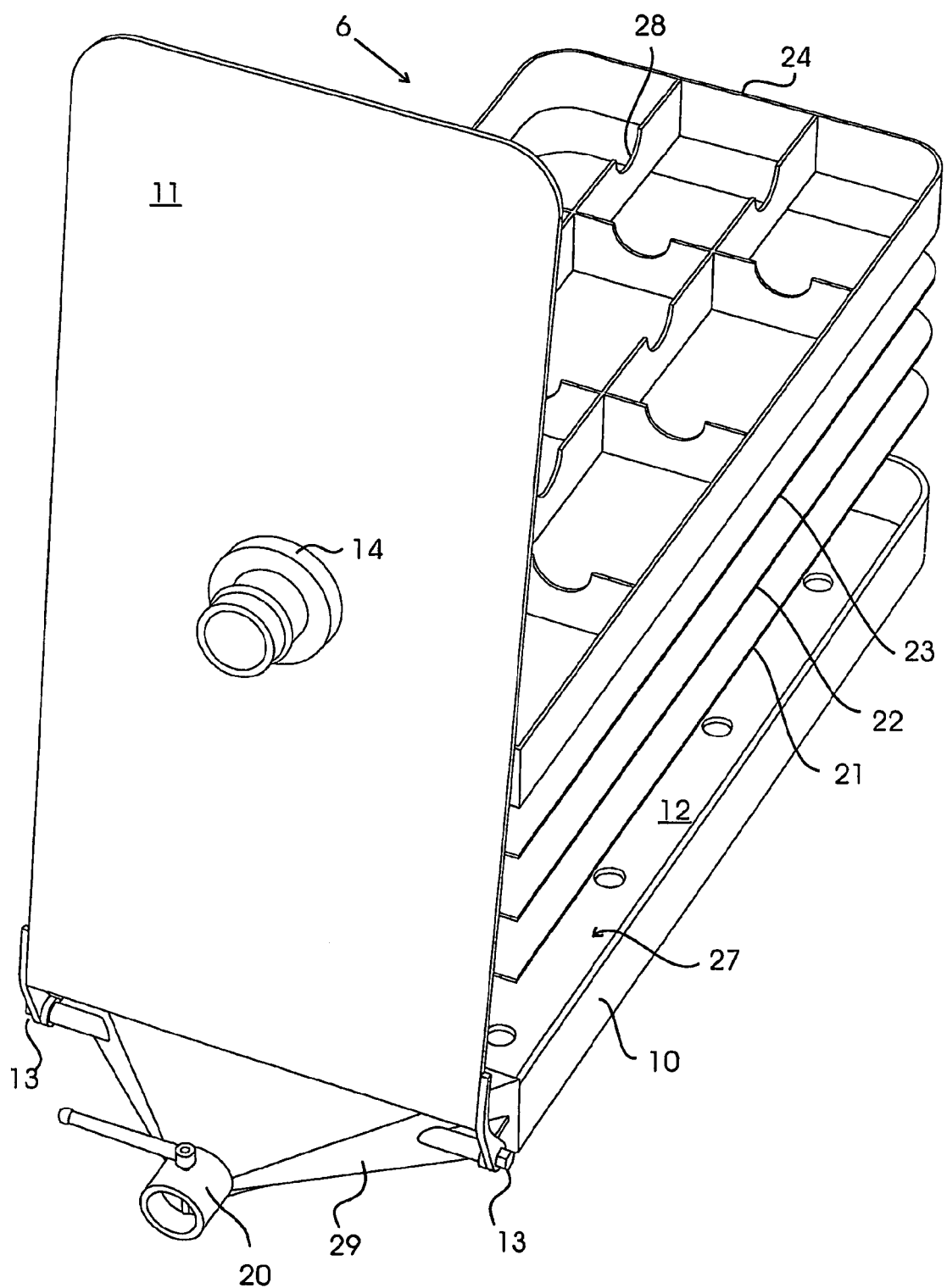
FIG. 4 shows the same seen from a second angle.
Figure 5:
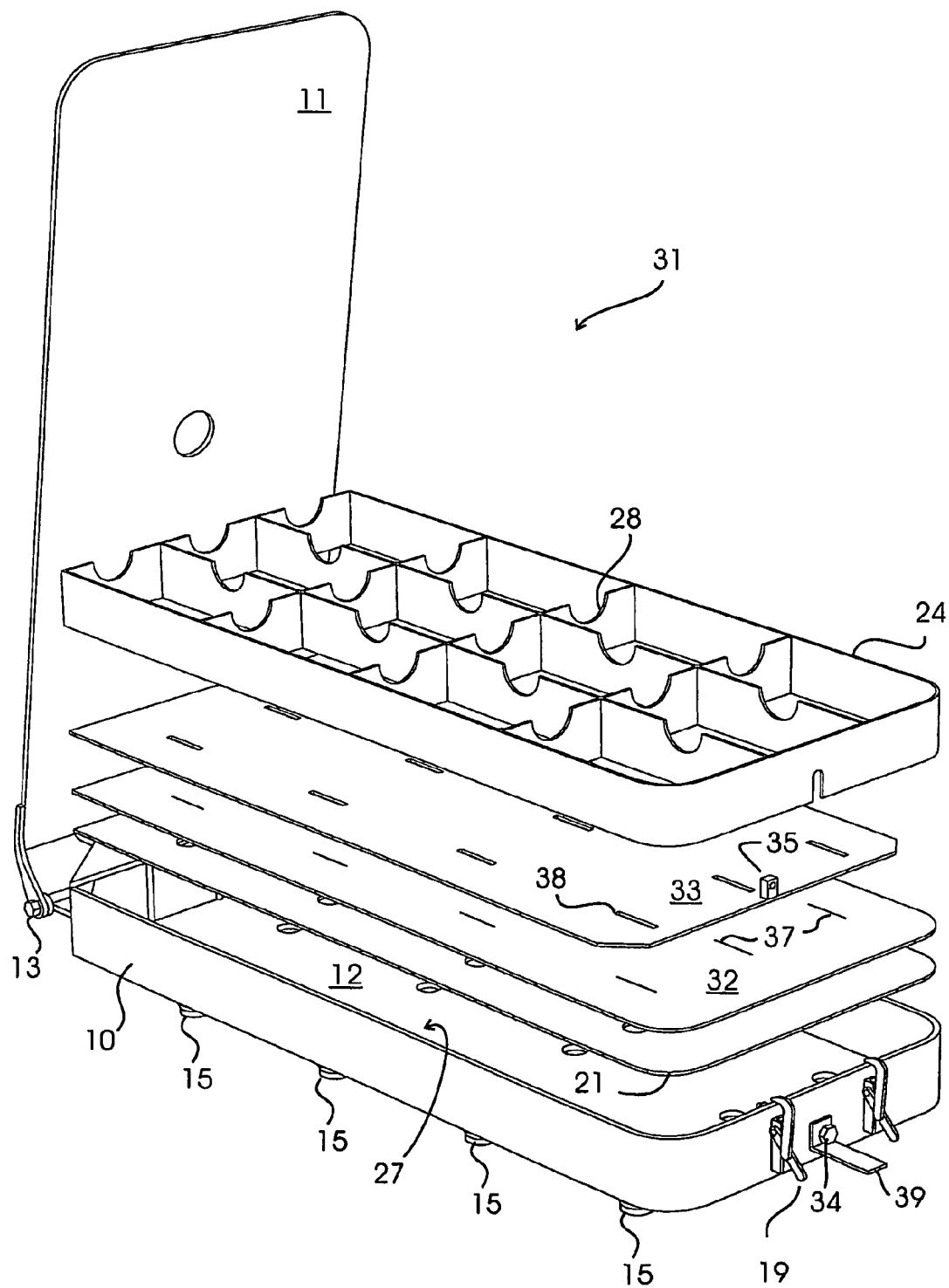
FIG. 5 shows an exploded view seen in perspective of a second embodiment of a distributor according to the invention.

FIG. 3 and FIG. 4 show the distributor 6 1 of FIG. 2 with the hoses removed, the lid 11 opened and the inner components taken out. On the inside of the distributor 6, there are four components, a sealing plate 21, an multi-orifice plate 22, a filter plate 23, and a grate 24. The place where the grate is placed can be defined as a distribution chamber 27 since the fluid is in this space distributed to the different orifices 26.

The sealing plate 21 is a sheet of soft rubber compound shaped to fit inside the housing 2. A number of holes 25 in the sealing plate 21 are arranged co-axially with the outlets 15 from the second wall 12. The holes 25 in the sealing plate 21 are of slightly larger diameter than the diameter of the out-lets 15 such that the sealing plate 21 has no throttling effect on the flow to the outlets 15. If it is desired to increase the sealing effect of the sealing plate 21, the holes in the sealing plate can be made as one-way valves (not shown).

The multi-orifice plate 22 is a plate of metal, or any other suitable material, with a number of small holes 26. The small holes 26 in the multi-orifice plate 15 are arranged co-axially with both the holes 25 in the sealing plate 21 and the outlets 15 in the second wall 12. The function of the multi-orifice plate 22 is to restrict the amount of flow output to each outlet 15. Suitable materials for the multi-orifice plate are materials which can be formed as plate-like objects and can tolerate the action of water being pressed through a small opening in said plate.

In the embodiment shown, the multi-orifice plate 22 has a rectangular array of equal sized holes 26. However patterns other than a rectangular array could also be used, two examples being a circular pattern and a linear pattern. It is also possible that the orifices on a multi-orifice plate are of different sizes. In this way custom multi-orifice plates (not shown) could be made for a certain machine, where different outlets have different sized orifices. In this way different nozzles can have different flow outputs.

The filter plate 23 is made of a fine mesh in order to trap particles before they reach the multi-orifice plate 22. For multi-orifice plates with very fine orifices, a fine filter plate is demanded to ensure that the orifices in the multi-orifice plate don't get plugged. If good filtration is present in the system before the fluid reaches the distributor, the filter plate can be neglected.

As mentioned before, the grate 24 is placed in the distribution chamber 27 of the distributor 6. The grate 24 is designed to press the multi-orifice plate 22 against the sealing plate 21 when the lid 11 is closed. The lid 11 is structurally reinforced so that the lid 11 exerts an even pressure on the grate 24 when the lid 11 is closed. Mountings such as the grate 24 and the sealing plate 21 are required to ensure that the output from one orifice 26 goes to one and only one outlet 15.

In order for the fluid to have the same pressure in front of each orifice, in other words throughout the distribution chamber 27, openings 28 are cut into the walls of the grate 24 to permit the fluid to assume the same pressure in each compartment of the grate 24. In another embodiment (not shown) the mountings could be made a part of the lid.

One end 29 of the frame 10 is conically formed with a shut-off valve 20 at its end. A series of rods 30 are placed at the top of the conical section 29 to prevent the components 21, 22, 23, 24 of the distributor 6 from sliding around within the frame 10. During normal operation, the shut-off valve 20 is closed, and the fluid pumped into the inlet 14 generates a pressure in the distribution chamber 27. Due to the pressure, the fluid is pressed through the orifices 26 in the multi-orifice plate 22 and the fluid is output from the distributor at the outlets 15. When the shut-off valve 20 is opened, the pressure in the distributor 6 falls and the fluid does not have enough pressure to push through the orifices 26 in the multi-orifice plate 22. Instead the fluid is flushed out through the shut-off valve 20. In this way, any contaminants, dirt particles, etc. inside the housing are flushed out via the shut-off valve 20. This provides a simple and effective self-cleaning mechanism for the distributor 6.

FIG. 5-8 show a second embodiment 31 of a distributor according to the current invention. The second embodiment 31 is very similar to the first embodiment 6 so the overall function of the second embodiment 31 won't be described in detail. In addition, identical parts in the two embodiments will be given the same reference numerals.

Figure 6:
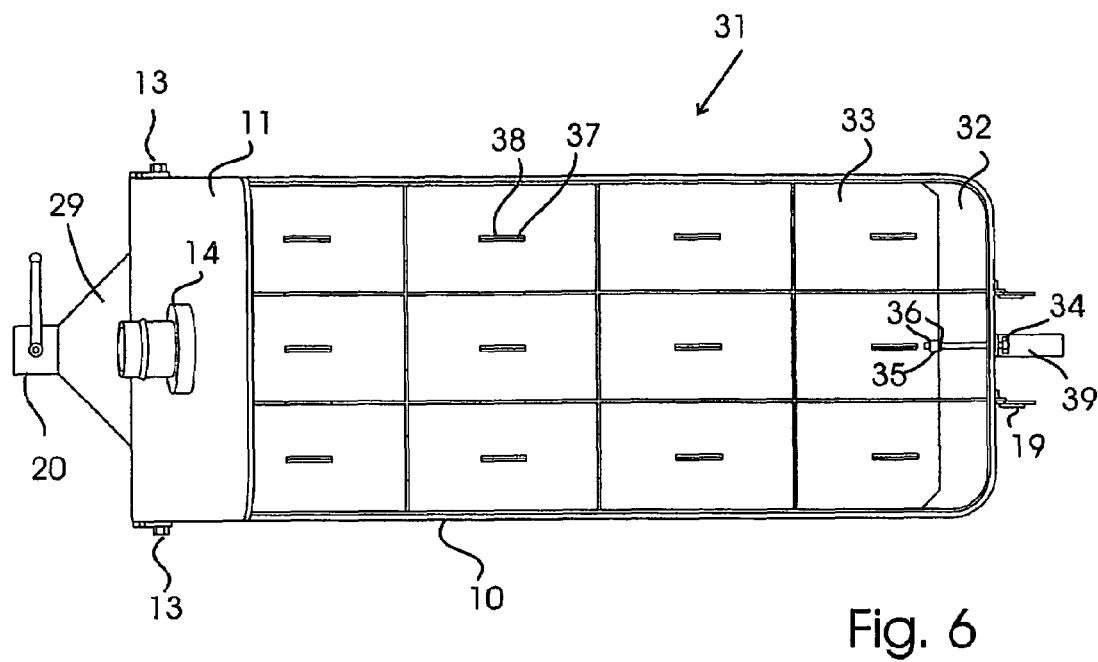
FIG. 6 shows a top view of the second embodiment of a distributor in a first position.
Figure 7:
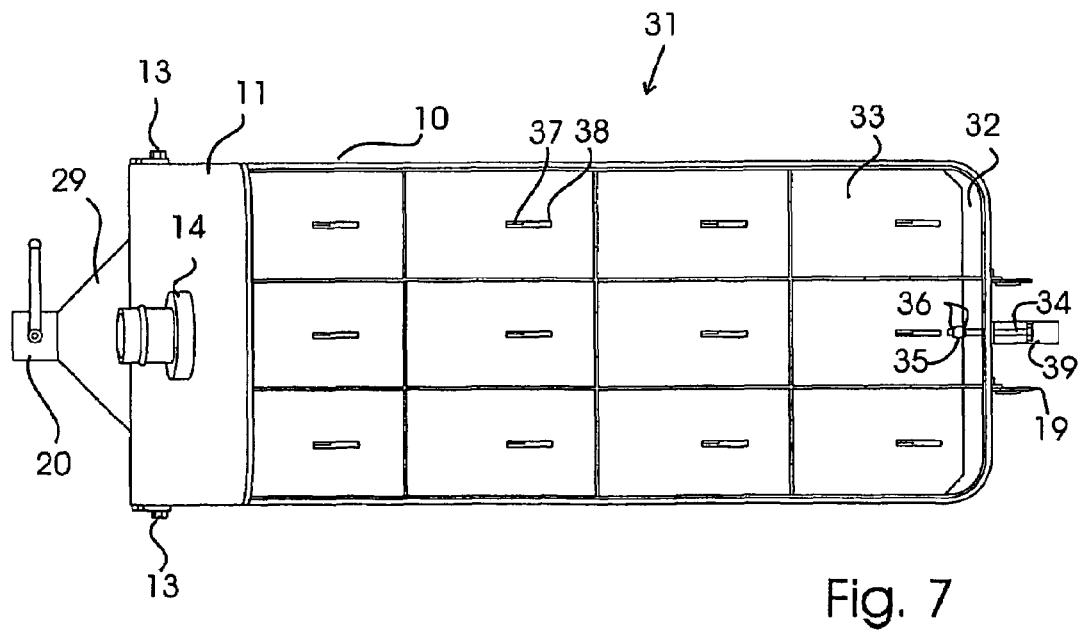
FIG. 7 shows the same in a second position.

The main difference between the two embodiments is that the distributor 31 in the second embodiment contains two multi-orifice plates 32,33. The two multi-orifice plates 32,33 are arranged such that they can slide relative to each other. Adjustment means 34,35,36 are provided to adjust how much the two multi-orifice plates 32,33 slide relative to each other. In the embodiment shown, the lower multi-orifice plate 32 is fixed in position within the housing when the lid 11 is closed. The lower multi-orifice plate 32 has a number of narrow slots 37. The upper multi-orifice plate 33 has a number of wider slots 38 which are aligned with the narrow slots 37 of the lower multi-orifice plate 32. The upper multi-orifice plate 33 is arranged in the frame 10 such that it can slide in a longitudinal direction. By sliding the upper multi-orifice plate 33 back and forth, the overlap between the slots 37,38 in the lower 32 and upper 33 multi-orifice plates can be adjusted. FIG. 6 shows the case where the two slots 37,38 completely overlap each other. This provides the largest amount of flow through the slots. FIG. 7 shows the case where the upper multi-orifice plate 33 has been slid longitudinally in the frame 10 such that the amount of overlap is reduced. In this case, the amount of flow through the slots is less. By sliding the upper multi-orifice plate 33 even more, the amount of overlap can be reduced to zero, thereby completely stopping the flow through the slots. By orienting the distributor such that the slots run in a vertical orientation, as is shown in FIG. 2, gravity helps to prevent contaminants from collecting in the slots 37,38.

In order to make the adjustment of the upper multi-orifice plate 33 possible without opening the lid 11, sliding means (not shown) could be provided both between the upper multi-orifice plate 33 and the grate 24 and between the upper multi-orifice plate 33 and the lower multi-orifice plate 32. Many different types of sliding means could be used. One example is a set of rollers and another example is a set of plastic bushings with special low friction properties. In another embodiment (not shown) a set of rails could be arranged between the two plates in order to ensure that the two plates slide along an axis relative to each other.

Figure 8:
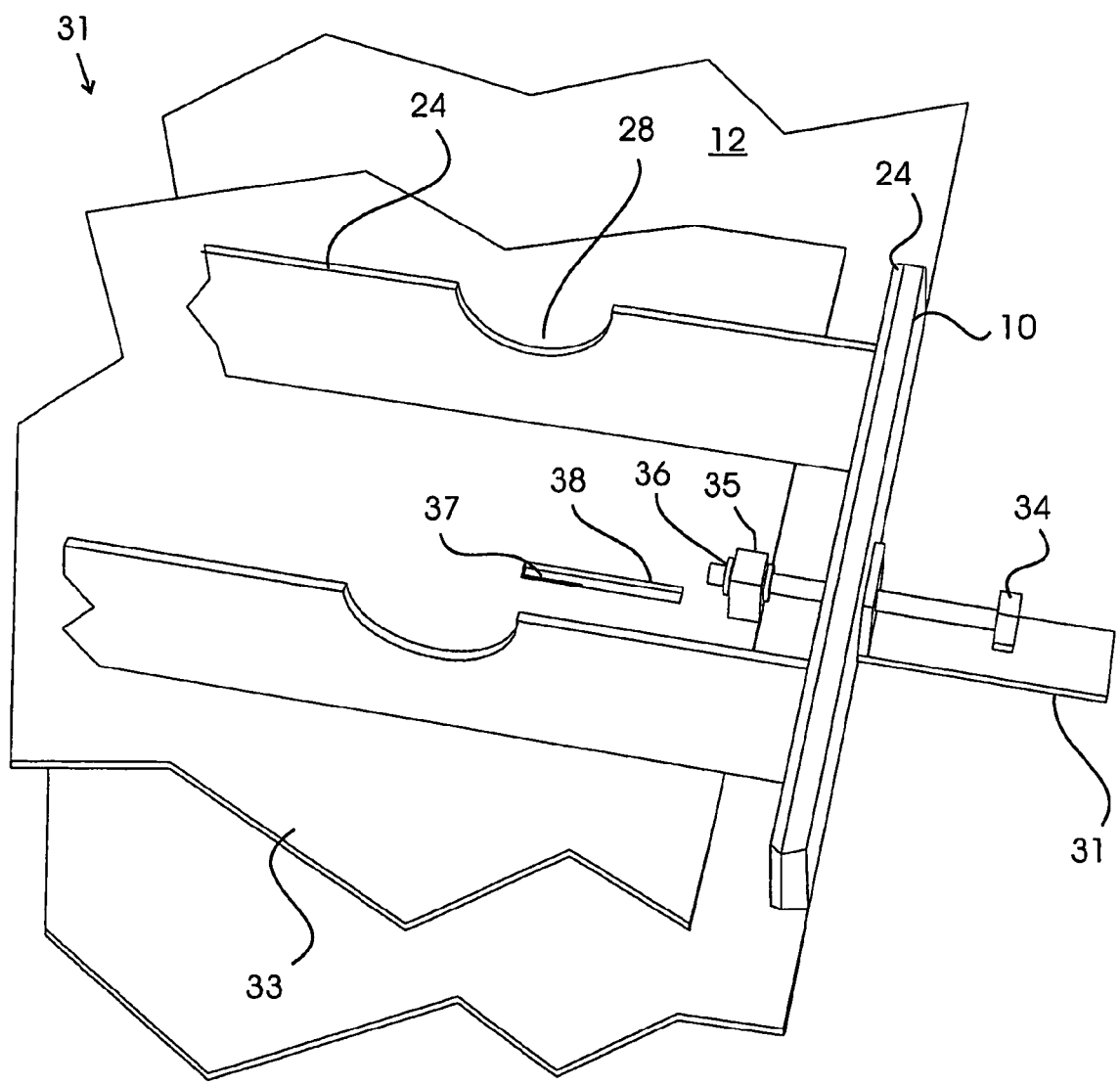
FIG. 8 shows an adjustment mechanism, and FIG. 9 schematically shows a third embodiment of a distributor according to the invention.

Adjustment means 34,35,36 are provided in order to finely adjust the position of the 30 upper multi-orifice plate 33 relative to the lower multi-orifice plate 32. A close-up of the adjustment means 34,35,36 is shown in FIG. 8. A screw 34 is provided within a thread in the frame 10. Depending on the direction in which the screw 34 is rotated, the screw 34 is either screwed out of the frame 10 or into the frame 10. A small block 35 with a hole is mounted to the upper multi-orifice plate 33. The hole in the small block 35 is of slightly larger diameter than the diameter of the screw 34. The end of the screw 34 fits into the hole in the block 35. Two washers 36, one on each side of the block 35, are placed in circumferential slots in the screw 34. In this way, as the screw 34 is screwed into or out of the frame 10, the upper multi-orifice plate 33 is also forced to slide within the frame 10. As the screw 34 is screwed into the frame 10, the overlap between the slots 37,38 is increased, leading to more flow. As the screw 34 is screwed out of the frame 10, the overlap between the slots 37,38 is reduced leading to less flow. A scale 39 is placed on the frame 10, in order to make adjustment of the multi-orifice plates 32,33 quicker and more accurate.

In order to ensure that the upper multi-orifice plate does not slide unintentionally, the adjustment means can be provided with a locking mechanism (not shown) in order to lock the position of the upper multi-orifice plate with respect to the frame. In the embodiment shown in FIG. 4-7, when the lid 11 is clamped shut, the multi-orifice plates 32,33 are pressed against each other and are prevented from sliding.

In order to prevent the fluid from leaking out of the housing at the adjustment means, the adjustment means should be properly sealed. In the embodiment shown, a seal (not shown) is located between the screw 34 and the frame 10.

The adjustment means shown in the second embodiment 31 is just one example of many different types of manual adjustment means. If more active control of the adjustment means is required, the adjustment means could also be automatically controlled (not shown). There are many different actuators which can be used to slide the multi-orifice plates relative to each other. Three examples are a hydraulic actuator, a pneumatic actuator, and a solenoid. In order to implement closed loop control of the adjustment means, the relative distance between the two plates can be measured with some sort of sensor, such as a potentiometer, an LVDT, etc. This position measurement can then be used together with a microcontroller and an actuator to control the relative distance between the two plates.

In addition, mechanical control solutions could also be implemented. One example of a mechanical control solution is a hydraulic actuator working against a spring, where the hydraulic pressure in the actuator is the pressure on the upstream side of the multi-orifice plate.

It is also possible that the adjustment means can be controlled such that the flow through the manifold is relative to the speed of the vehicle. For example, as the vehicle increases its speed, the multi-orifice plates can be adjusted such that the amount of flow through the multi-orifice plates is increased. Many different types of sensors can be used to measure the speed of the vehicle. Two examples of such sensors are an encoder and a tachometer mounted to a wheel of the vehicle.

If a purely mechanical solution is desired, a fluid pump can be connected to one of the wheels of the vehicle. As the vehicle speed increases, the fluid pump increases the pressure in a hydraulic actuator connected to the sliding multi-orifice plate. Another solution is to use a centrifugal device mounted to one of the vehicle's wheels to control the position of the sliding multi-orifice plate.

Figure 9:
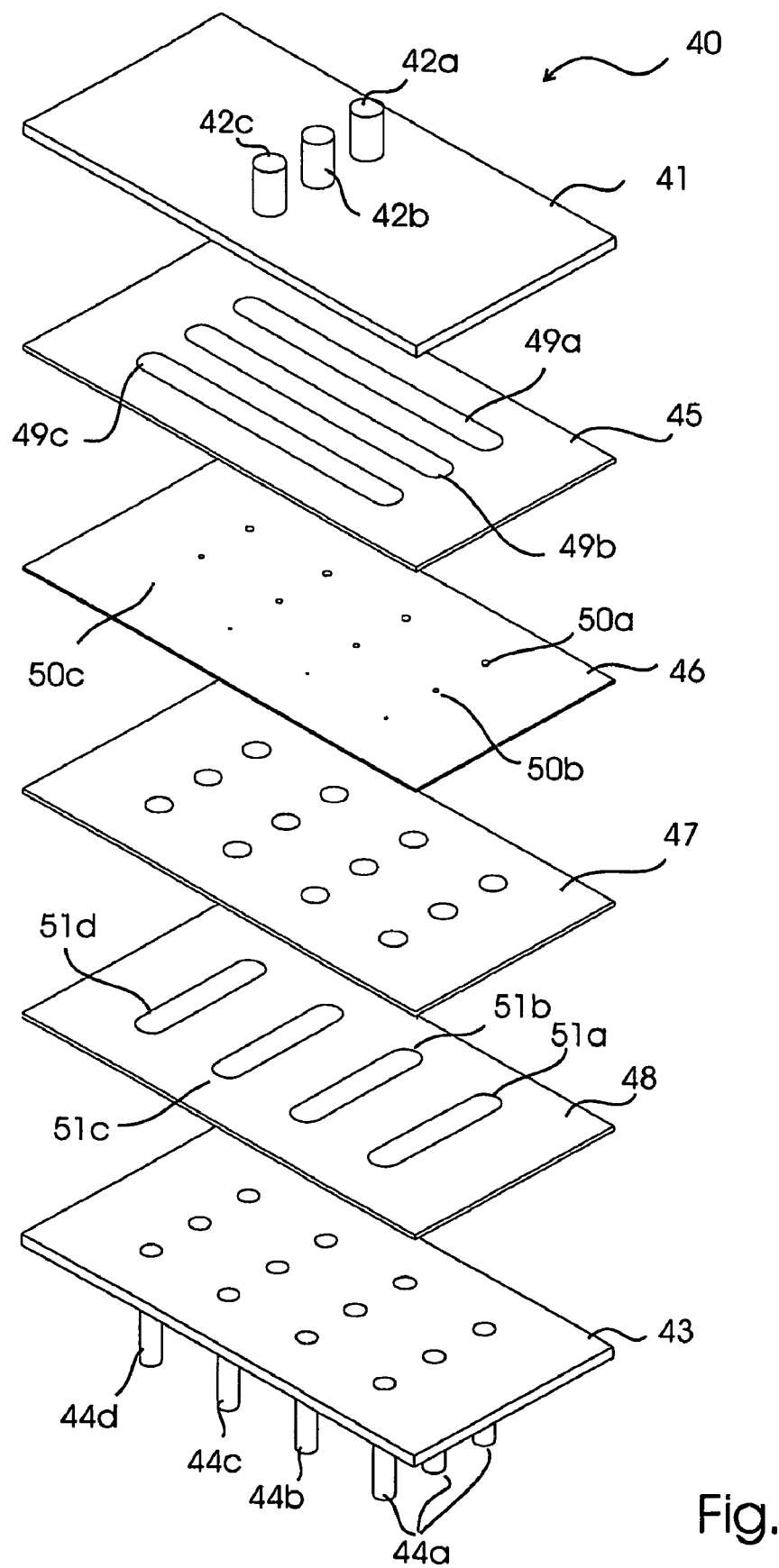

A third embodiment 40 of a distributor according to the invention is schematically shown in FIG. 9. The details of the distributor 40 are not shown, only the basic function.

The distributor comprises of an inlet plate 41 with 3 inlets 42a, 42b, 42c and an outlet plate 43 with 4 groups of three outlets 44a, 44b, 44c, 44d. Sandwiched between the inlet plate 41 and the outlet plate 43 are a first distribution plate 45, a multi-orifice plate 46, a sealing plate 47, and a second distribution plate 48.

During use, only one inlet 42 is connected to the reservoir. Each inlet 42a, 42b, 42c is connected to one distribution chamber 49a,49b,49c in the first distribution plate 45. Each distribution chamber 49a, 49b, 49c is connected with one set of orifices 50a, 50b, 50c in the multi-orifice plate 46. The orifices in each of the orifice sets 50a, 50b, 50c, are of a different size that the other orifice sets 50a, 50b, 50c. In this way the flow can be adjusted by changing which inlet is connected to the reservoir. If high flow is desired, then the reservoir is connected to the first inlet 42a. If medium flow is desired, then the second inlet 42b is used. If low flow is desired, then the third inlet 42c is used.

The sealing plate 47 ensures that the flow from one orifice does not mix with the flow from other orifices.

The second distribution plate 48 connects a number of the outlets together with slots 51a, 51b, 51c, 51d so that the flows out of the connected outlets 44a, 44b, 44c, 44d are the same. In the example embodiment shown in FIG. 9, the outlets are connected in four groups of three 44a, 44b, 44c, 44d.

This embodiment 40 provides a distributor which allows very quick changing of the flow rate. Just by changing which inlet is being used, the flow rate out of the nozzles is instantly changed. The changing of the inlet can occur in many ways, both mechanical and automatically. One example of a mechanical approach is to switch a hose manually (not shown). One example of an automatic approach is to use solenoid valves (not shown) on the different inlets 42a,42b,42c.

The distribution plates 45,48 can be made of many different types of materials. Some examples are rubber, metal, plastic, etc.

The three embodiments described above are mainly rectangular in shape and have a bottom and a lid which are pressed together when the housing is closed. However, many other forms of housings can be imaged within the scope of the patent. One example (not shown) is a circular housing where the housing is screwed together such that the housing can be unscrewed and opened in order to change the multi-orifice plate. Another example is a rectangular housing with a slot at one end through which multi-orifice plates can be removed and replaced.

What is claimed is:

1. A distributor mountable on a vehicle for distributing a fluid from a reservoir to a number of fluid application nozzles through which the fluid is dispensed, comprising
   a housing,
   a first number of fluid connections extending from the reservoir to the housing,
   a second number of fluid connections each extending from the housing to a fluid application nozzle,
   at least one multi-orifice plate,
   mountings in the housing for detachably fixing one or more multi-orifice plates at a time in the housing and including at least one distribution or sealing plate,
   a distribution chamber inside the housing, which is in communication with both the first number of fluid connections and the orifices of the multi-orifice plate(s) fixed in the housing, and
   a third number of fluid connections extending from each their orifice in said multi-orifice plate(s) to each their second fluid connection, wherein the mountings are arranged in a manner such that for each multi-orifice plate, a uniform pressure is applied to the multi-orifice plate for the purpose of ensuring that the output from each of the third number of fluid connections is conducted only to its associated second fluid connection.

2. The distributor according to claim 1, wherein a number of multi-orifice plates are provided, with the orifices in at least some of the multi-orifice plates having different sizes than the orifices in at least some of the other multi-orifice plates.

3. The distributor according to claim 2, wherein most of the orifices in at least one multi-orifice plate are of the same size.

4. A distributor mountable on a vehicle for distributing a fluid from a reservoir to a number of fluid application nozzles through which the fluid is dispensed, comprising
- a housing,
- a first number of fluid connections extending from the reservoir to the housing,
- a second number of fluid connections each extending from the housing to a fluid application nozzle,
- at least one multi-orifice plate,
- mountings in the housing for detachably fixing one or more multi-orifice plates at a time in the housing and including at least one distribution or sealing plate,
- a distribution chamber inside the housing, which is in communication with both the first number of fluid connections and the orifices of the multi-orifice plate(s) fixed in the housing, and
- a third number of fluid connections extending from each their orifice in said multi-orifice plate(s) to each their second fluid connection,
- wherein the housing comprises: a frame, a first wall which is mounted on one side of the frame and is provided with at least one inlet for the first number of fluid connections, and a second wall which is mounted on an opposite side of the frame and is provided with outlets for the second number of fluid connections.

5. The distributor according to claim 1, wherein the mountings for fixing the multi-orifice plate(s) in the housing comprise a grate that is placed in the distribution chamber and that defines a number of through openings, at least some of which are in communication with each other.

6. A distributor mountable on a vehicle for distributing a fluid from a reservoir to a number of fluid application nozzles through which the fluid is dispensed, comprising
- a housing,
- a first number of fluid connections extending from the reservoir to the housing,
- a second number of fluid connections each extending from the housing to a fluid application nozzle,
- at least one multi-orifice plate,
- mountings in the housing for detachably fixing one or more multi-orifice plates at a time in the housing and including at least one distribution or sealing plate,
- a distribution chamber inside the housing, which is in communication with both the first number of fluid connections and the orifices of the multi-orifice plate(s) fixed in the housing, and
- a third number of fluid connections extending from each their orifice in said multi-orifice plate(s) to each their second fluid connection,
- wherein the housing comprises: a rectangular frame, a first wall which is mounted on one side of the frame and is provided with at least one inlet for the first number of fluid connections, a second wall which is mounted on an opposite side of the frame and is provided with outlets for the second number of fluid connections; and pressure means for directly or indirectly pressuring the multi-orifice plate(s) against the second wall of the housing.

7. The distributor according claim 6, wherein either the first wall or the second wall of the housing is movably mounted on the frame and that the pressure means are adapted to act upon the wall with a pressure directed against the opposite wall.

8. The distributor according to claim 6, wherein either the first wall or the second wall of the housing is pivotably mounted on the frame and that the pressure means are adapted to act on the wall with a moment of rotation.

9. The distributor according to claim 2, wherein at least two mutually slidable multi-orifice plates with overlapping orifices are arranged inside the housing.

10. The distributor according to claim 9, wherein the orifices in at least one of the slidable multi-orifice plates are narrow slots.

11. The distributor according to claim 1, which further comprises a cleaning outlet with a shut-off valve, the outlet being located in the housing between a first wall of the housing and the multi-orifice plate(s) mounted in the housing.

* * * * *

UNITED STATES PATENT AND TRADEMARK OFFICE
CERTIFICATE OF CORRECTION

PATENT NO. : 7,347,387 B2  Page 1 of 1
APPLICATION NO. : 11/454637
DATED : March 25, 2008
INVENTOR(S) : Hedegård It is certified that error appears in the above-identified patent and that said Letters Patent is hereby corrected as shown below:

Title Page:
Items (12) and (76) correct the last name of the inventor from "HedegÅrd" to
-- Hedegård --. The inventor's name will then correctly appear as "Albert Hedegård".

Signed and Sealed this

Twenty-fourth Day of June, 2008

JON W. DUDAS
*Director of the United States Patent and Trademark Office*